United States Patent
Uhlhorn

(10) Patent No.: US 7,525,461 B1
(45) Date of Patent: Apr. 28, 2009

(54) OPTICAL DIGITAL TO ANALOG CONVERSION

(75) Inventor: Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/977,822

(22) Filed: Oct. 26, 2007

(51) Int. Cl.
*H03M 1/00* (2006.01)
(52) U.S. Cl. ........................ 341/137; 341/144
(58) Field of Classification Search ........... 341/137, 341/144; 359/245, 114
See application file for complete search history.

(56) References Cited

U.S. PATENT DOCUMENTS

| | | | |
|---|---|---|---|
| 3,985,423 | A | 10/1976 | Tseng |
| 5,039,988 | A * | 8/1991 | Hong .................. 341/137 |
| 5,870,217 | A * | 2/1999 | Itou et al. ............. 398/97 |
| 6,374,003 | B1 * | 4/2002 | Ding et al. ............. 385/14 |
| 6,404,365 | B1 * | 6/2002 | Heflinger ............. 341/137 |
| 7,061,414 | B2 | 6/2006 | Chen et al. |
| 7,403,711 | B2 * | 7/2008 | Chen et al. ............ 398/45 |

OTHER PUBLICATIONS

Wikipedia. "Arrayed waveguide grating". Nov. 2006, http://en.wikipedia.org/wiki/Arrayed_waveguide_grating.
Wikipedia. "Optical ring resonators". Jul. 2006, http://en.wikipedia.org/wiki/Optical_ring_resonators.
Wikipedia. "Split Ring Resonator". May 2007 , http://en.wikipedia.org/wiki/Split_Ring_Resonator.

* cited by examiner

*Primary Examiner*—Peguy JeanPierre
(74) *Attorney, Agent, or Firm*—Brooks, Cameron & Huebsch, PLLC

(57) ABSTRACT

Embodiments of the present disclosure include apparatuses, systems, and methods of providing optical digital to analog conversion. A method embodiment includes receiving an optical signal that includes a plurality of wavelengths, splitting the received optical signal into a plurality of optical beams each including the plurality of wavelengths, modifying the particular wavelengths present in at least one of the plurality of optical beams based on a digital input, and recombining the plurality of optical beams to produce an optically converted multi-wavelength analog optical signal.

23 Claims, 2 Drawing Sheets

US 7,525,461 B1

OPTICAL DIGITAL TO ANALOG CONVERSION

FIELD OF THE DISCLOSURE

The present disclosure generally relates to optical signals. And, in particular, the present disclosure relates to converting digital information into an analog optical signal.

BACKGROUND

In various optical transmission systems, it can be useful for digital data to be converted to analog form for processing and/or transmission. The use of optical technology for implementing digital to analog (D/A) converters can have various advantages, including, for example, high-speed clocking and signal sampling, wide-bandwidth, and light-weight components, among others.

A previous approach to optical D/A conversion involves using several electronic D/A converters to convert digital data into an electrical analog signal. The electrical analog signal is then applied to an optical modulator of a laser to impress the electrical analog signal onto the intensity of light at a single wavelength. As such, this method can involve the use of many separate electronic D/A converters as well as many optical modulators and/or lasers in order to provide an optical analog signal at a number of different wavelengths.

Another approach to optical D/A conversion involves splitting light from an optical source evenly into many mutually coherent optical beams. In this approach, the light associated with each mutually coherent beam is phase shifted according to digital data and is passed to a combiner element which merges the light back into a single fiber. The interference associated with the phase shifted mutually coherent beams affects the intensity of the light and generates an analog signal for a particular wavelength. As such, this method can be limited to coherent optical sources and can involve the use of multiple different coherent optical sources and numerous optical components in order to produce analog signals at different wavelengths.

SUMMARY

Embodiments of the present disclosure include apparatuses, systems, and methods for providing optical digital to analog conversion. Various embodiments can convert digital data into a multi-wavelength analog optical signal. Embodiments of the present disclosure can be utilized for various applications such as optical computing and/or sensing systems, among others.

Various method embodiments include receiving an optical signal that includes a plurality of wavelengths, splitting the received optical signal into a plurality of optical beams each including the plurality of wavelengths, modifying the particular wavelengths present in at least one of the plurality of optical beams based on a digital input, and recombining the plurality of optical beams to produce an optically converted multi-wavelength analog optical signal. In various embodiments, the particular wavelengths present in each of the plurality of optical beams can be modified.

In various embodiments, the optical beams each have a respective input optical branch and output optical branch. In some such embodiments, a number of wavelength filters can be coupled between the respective input and output optical branches.

In various embodiments, the digital input can include a data sequence corresponding to a number of control signals (e.g., digital input signals). The control signals can be based on digital information (e.g., a digital data sequence received from an electronic component such as a memory and/or processor). In such embodiments, the digital information can be coded as binary, grayscale, or even code, among other types of digital coding.

In various embodiments, a digital data sequence can include a multi-channel digital array. In some such embodiments, each channel of the digital array can provide a number of bits of data to be converted to the multi-wavelength analog optical signal. In various embodiments, the number of channels in the digital array corresponds with the number of wavelengths represented in the multi-wavelength analog optical signal.

In various embodiments, the multi-wavelength analog optical signal can be provided to an optical computing component (e.g., an optical computing device) and/or a sensing device and/or system.

In various embodiments, modifying the particular wavelengths includes filtering which of the plurality of wavelengths of the plurality of optical beams are transferred from the respective input optical branch to the respective output optical branch. In some such embodiments, modifying the particular wavelengths present in the plurality of optical beams can include providing each optical beam to a respective wavelength filter that transmits selected wavelengths.

In various embodiments, optical ring resonators can be used to filter which of the plurality of wavelengths of the plurality of beams are transferred to the respective output optical branch. However, embodiments are not limited to a particular wavelength filtering mechanism.

For instance, in some embodiments, the wavelength filtering mechanism can include one or more filter-modulator pairs. As one example, and as described in connection with FIG. 2, a filter modulator pair can include an arrayed waveguide grating (AWG) coupled to an optical modulator (e.g., an electro-optic modulator (EOM) or electro-absorptive modulator (EAM), among other types of modulators).

In various embodiments, a filtering mechanism can perform as a switch. For instance, in some embodiments, in which the filtering mechanism includes a number of optical ring resonators, the ring resonators can be configured to transfer light having a particular wavelength.

In some such embodiments, the ring resonators can be controlled based on control signals provided thereto. The control signals can be based on a digital data sequence stored in a memory and/or provided by a processor.

As one example, if the digital information (e.g., data bit associated with a digital control signal) corresponds to a logic high control signal (e.g., a binary "1") then the optical ring resonator can transfer light having the particular wavelength (e.g., from an input optical branch to a corresponding output optical branch). In such an example, if the digital information corresponds to a logic low control signal (e.g., a binary "0") then the optical ring resonator can prevent transfer of light having the particular wavelength. Embodiments are not limited to this example.

For example, in some embodiments, in which the wavelength filtering mechanism includes one or more filter-modulator pairs, an optical modulator can receive light of a particular wavelength from an associated wavelength filter. In some such embodiments, the optical modulator can be controlled via control signals provided thereto based on a digital data sequence.

In such embodiments, the modulator can perform as a switch. For instance, whether the light having the particular wavelength is transferred via the modulator can depend on whether a logic "1" or "0" is provided to the modulator. As such whether light having an associated wavelength is transferred to an output optical branch can depend on the digital data sequence.

In various embodiments, an optical power splitter can receive the optical signal generated by the optical source and can split the received signal such that the optical power associated with the plurality of optical beams is different for at least two of the optical beams. In various embodiments, the optical source can be a broad spectrum source (e.g., the optical signal generated by the optical source can include many different wavelengths).

In some such embodiments, the optical source can be a multi-wavelength comb optical source. The optical source can provide a continuous wave optical signal or a pulsed optical signal.

In various embodiments, the optical source can generate an incoherent optical signal. However, embodiments are not limited to broad spectrum optical sources, to a particular type of broad spectrum optical source, or to optical sources that generate incoherent optical signals.

An apparatus for optical digital to analog conversion according to an embodiment of the present disclosure can include an optical splitter that receives a multi-wavelength optical signal and splits the received optical signal into a plurality of split multi-wavelength signals. The apparatus can include a corresponding plurality of wavelength filtering mechanisms that receive the plurality of split multi-wavelength signals and modify the particular wavelengths present in the plurality of split multi-wavelength signals. In various embodiments, the apparatus can include a digital control component that provides control signals to the wavelength filtering mechanisms for controlling modification of the particular wavelengths, and an optical combiner that recombines the modified plurality of split multi-wavelength signals to produce a multi-wavelength analog optical signal.

In various embodiments, and as discussed below in connection with FIGS. 1 and 2, each of the plurality of wavelength filtering mechanisms, corresponding to the respective plurality of split multi-wavelength signals, can be configured to modify the same wavelengths for the plurality of split multi-wavelength signals.

In some embodiments, the plurality of wavelength filtering mechanisms includes a number of optical ring resonators. In some embodiments, the plurality of wavelength filtering mechanisms includes an arrayed waveguide grating (AWG) pair for each of the respective plurality of split multi-wavelength signals. In some such embodiments, the filtering mechanism can include a number of modulators coupled to each AWG pair.

In various embodiments, an optical amplifier can be coupled to the optical splitter and/or the optical combiner. In such embodiments, the optical amplifier can amplify the optical signal generated by the optical source prior to the signal being split by the optical splitter.

In some embodiments, a plurality of optical amplifiers can be positioned to receive and amplify each of the split multi-wavelength signals. In such embodiments, the plurality of optical amplifiers can be positioned so as to amplify the plurality of split multi-wavelength signals before or after modification of the particular wavelengths present therein.

In various embodiments, the optical splitter is an optical power splitter. In some such embodiments, the power associated with each of the plurality of split multi-wavelength signals can be less than the power associated with the received multi-wavelength optical signal.

In such embodiments, the total power associated with the optical signal received by the optical splitter can be allocated among the plurality of split multi-wavelength signals in various manners. For instance, the power allocated to each of the split multi-wavelength signals can be allocated evenly among the plurality of split multi-wavelength signals.

As another example, the power allocated to each of the plurality of split multi-wavelength signals can be allocated proportionally. For instance, a first of the plurality of split multi-wavelength signals may be allocated half of the total power associated with the optical signal received by the optical splitter, and the remaining half of the total power can be allocated evenly or proportionally among the remaining of the plurality of split multi-wavelength signals.

In various embodiments, the power allocation associated with the plurality of split multi-wavelength signals can depend on the manner in which the digital data is presented from the digital control component. For example, the power allocation can depend on whether a digital array of data is presented in standard binary, grayscale, or pure even scheme. Embodiments are not limited to a particular type of digital data scheme.

An optical system for optical digital to analog conversion according to an embodiment of the present disclosure includes an optical source that generates a multi-wavelength optical signal. In various embodiments, the system includes an optical splitter that splits the multi-wavelength optical signal into a plurality of split multi-wavelength signals associated with a corresponding plurality of optical branches.

In various embodiments, each optical branch can have an associated wavelength filtering mechanism that can receive a number of control signals associated with a digital data sequence from a digital control component and can modify the number of wavelengths present in at least one of the split multi-wavelength signals based on the received control signals. In various embodiments, the system includes an optical combiner coupled to the plurality of optical branches, where the combiner recombines the plurality of split multi-wavelength signals to produce an optically converted multi-wavelength analog optical signal.

DETAILED DESCRIPTION

Figure 1:
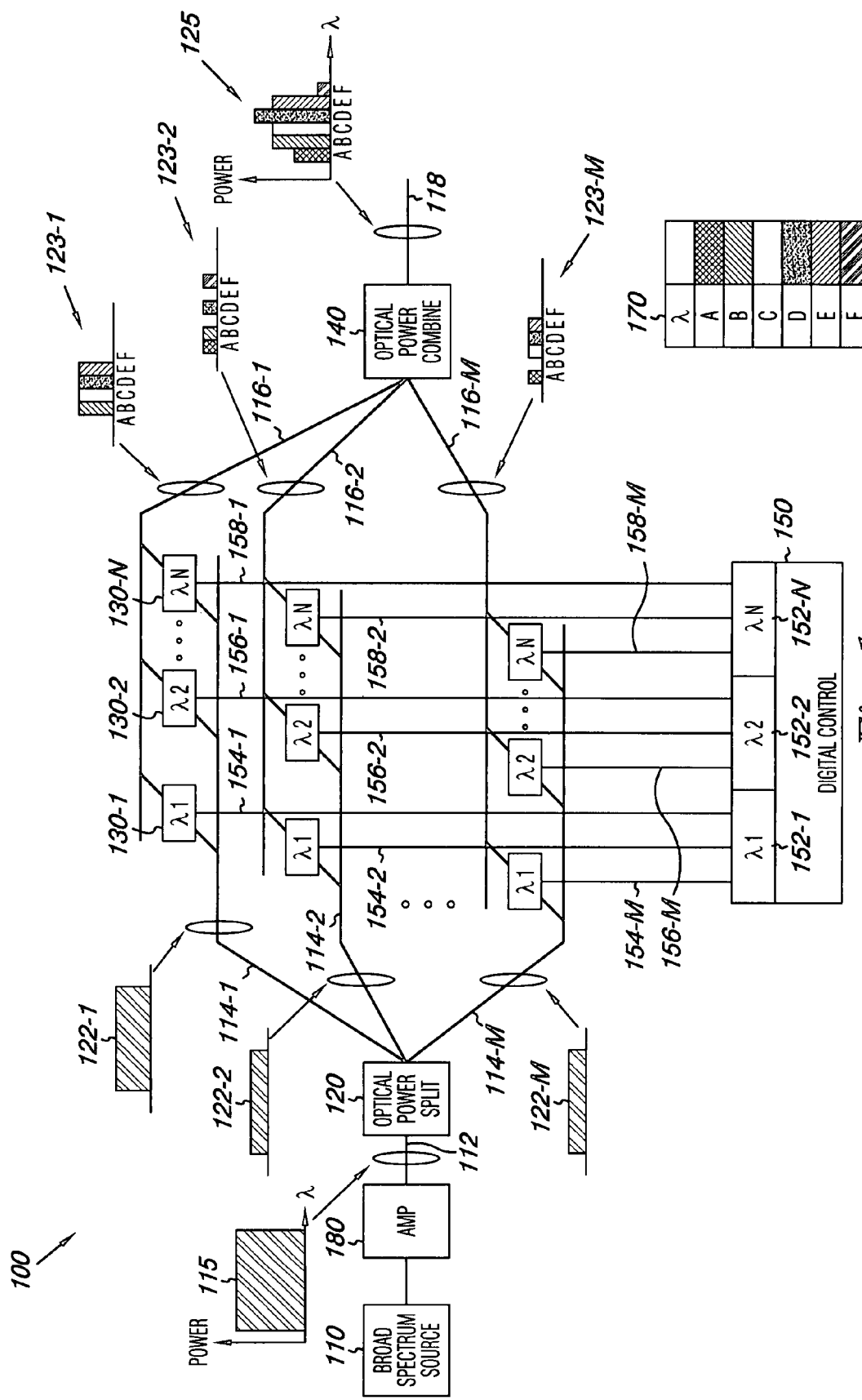
FIG. 1 illustrates a system for optical digital to analog conversion according to an embodiment of the present disclosure.

Embodiments of the present disclosure include apparatuses, systems, and methods for providing optical digital to analog conversion. Various embodiments can convert digital data into a multi-wavelength analog optical signal that can be provided to, for example, various optical computing components and/or various sensors and/or sensing systems.

Embodiments of the present disclosure are described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing.

The scaling of the figures does not represent precise dimensions and/or dimensional ratios of the various elements illustrated herein.

FIG. 1 illustrates a system 100 for optical digital to analog conversion according to an embodiment of the present disclosure. The system 100 shown in FIG. 1 includes an optical source 110 that generates an optical signal 115. The optical source 110 can be a light source such as a continuous wave or pulsed laser source that can generate an optical signal at a desired wavelength, or wavelengths. In various embodiments, the optical source 110 can be a broad spectrum source such as a multi-wavelength comb optical source that can generate an optical signal that includes light at multiple different wavelengths within a particular wavelength band.

In various embodiments, the optical source can generate an incoherent optical signal. That is, embodiments are not limited to coherent optical sources (e.g., coherent lasers), which may use numerous sophisticated optical elements in order to properly combine and/or focus the coherent signal.

In the embodiment illustrated in FIG. 1, the optical signal 115 is a multi-wavelength signal. As described further below, in the embodiment illustrated in FIG. 1, the optical signal 115 includes light at six different wavelengths (e.g., wavelengths A through F as shown in table 170) which are to be modified based on digital data in order to convert the data into a multi-wavelength analog optical signal (e.g., 125). Embodiments of the present disclosure are not limited to a particular type of optical source, to light within a particular wavelength band, or to a particular number of wavelengths to be modified.

As illustrated in the embodiment of FIG. 1, the optical signal 115 can be provided to an optical splitter 120 via optical path 112. In various embodiments, and as illustrated in FIG. 1, the optical signal generated by the optical source can be amplified (e.g., via optical amplifier 180) prior to being received by the optical splitter. As one of ordinary skill in the art will appreciate, one or more optical amplifiers can be placed at various other locations within the system 100 and, in some embodiments, the system does not include an optical amplifier.

The optical splitter can be an optical power splitter 120 that can optically split the optical signal 115 into a number of optical beams (e.g., 122-1, 122-2, . . . , 122-M) having corresponding optical paths (e.g., 114-1, 114-2, . . . , 114-M). In such embodiments, the total power associated with the optical signal 115 can be allocated among the number of optical beams 122-1, 122-2, . . . , 122-M. The optical beams (e.g., 122-1, 122-2, . . . , 122-M) can each include the same wavelengths present in the optical signal 115 and can be referred to herein as split multi-wavelength optical signals. For instance, as shown in FIG. 1, the optical beams 122-1, 122-2, . . . , 122-M each include light within the same wavelength band as that of optical signal 115.

The power associated with optical signal 115 can be allocated among the split multi-wavelength signals (e.g., 122-1, 122-2, . . . , 122-M) in various manners. For instance, the power allocated to each of the split multi-wavelength signals can be allocated evenly among the plurality of split multi-wavelength signals. For example, if the optical signal 115 were to be split into four optical beams, then one fourth of the total power associated with optical beam 115 could be allocated to each of the four optical beams.

As another example, the power allocated to each of the plurality of split multi-wavelength signals can be allocated proportionally. For instance, in the embodiment illustrated in FIG. 1, a first of the plurality of split multi-wavelength signals (e.g., 122-1) is allocated half of the total power associated with the optical signal 115 received by the optical splitter 120, and the remaining half of the total power is allocated among the remaining split multi-wavelength signals (e.g., one fourth of the power of signal 115 is allocated to split signal 122-2 and one fourth of the power of signal 115 is allocated to split signal 122-M).

The manner in which the power associated with optical signal 115 is allocated among the optical beams 122-1, 122-2, . . . , 122-M can be based on factors such as the manner in which digital data to be converted is presented from a digital control component (e.g., 150), among others. For example, the power allocation can depend on whether a digital array of data to be converted to a multi-wavelength analog optical signal (e.g., 125) is presented in a standard binary, grayscale, or pure even scheme. Embodiments are not limited to a particular type of digital data scheme.

In various embodiments, the number of optical beams (e.g., 122-1, 122-2, . . . , 122-M) into which the optical signal (e.g., 115) is split can be based on a desired resolution of wavelength intensity associated with the multiple wavelengths present in the optical beams. For instance, as the reader will appreciate based on the present disclosure, the resolution of the intensity of light at a number of particular wavelengths (e.g., wavelengths A through F) can be increased by increasing the number optical beams to be modified (e.g., the number of optical beams into which the optical signal 115 is split).

As described herein, in various embodiments, the particular wavelengths present in at least one of the split multi-wavelength signals (e.g., 122-1, 122-2, . . . , 122-M) can be modified based on a digital input. In various embodiments, the modified beams can be recombined to produce an optically converted multi-wavelength analog optical signal (e.g., 125).

In various embodiments, the optical paths 114-1, 114-2, . . . , 114-M corresponding to the split multi-wavelength signals 122-1, 122-2, . . . , 122-M, respectively, can each be coupled to a wavelength filtering mechanism. The wavelength filtering mechanisms associated with the optical paths 114-1, 114-2, . . . , 114-M can be controlled in order to transfer selected wavelengths present in the respective split signals 122-1, 122-2, . . . , 122-M to respective output optical paths 116-1, 116-2, . . . , 116-M.

For instance, a wavelength filtering mechanism coupled between input optical path 114-1 and output optical path 116-1 can be controlled in order to transfer selected wavelengths present in optical beam 122-1 through the filtering mechanism to output optical path 116-1. Similarly, a wavelength filtering mechanism coupled between input optical path 114-2 and output optical path 116-2 can be controlled in order to transfer selected wavelengths present in optical beam 122-2 through the filtering mechanism to output optical path 116-2. Also, a wavelength filtering mechanism coupled between input optical path 114-M and output optical path 116-M can be controlled in order to transfer selected wavelengths present in optical beam 122-M through the filtering mechanism to output optical path 116-M.

In this manner, the number of particular wavelengths present in the optical beams 122-1, 122-1, and 122-M can be modified (e.g., reduced) which can result in respective modified optical signals 123-1, 123-2, and 123-M. The modified optical signals 123-1, 123-2, and 123-M include light having only those selected wavelengths transferred through the filtering mechanism associated with the respective split optical paths.

As shown in FIG. 1, the modified optical signals 123-1, 123-2, . . . , 123-M can be provided to an optical combiner 140 (e.g., a multi-mode optical combiner) coupled to the output optical paths 116-1, 116-2, . . . , 116-M. The combiner 140 can combine the modified optical signals 123-1, 123-2, ..., 123-M to produce a multi-wavelength analog optical signal (e.g., 125). As such, and as described further below, the intensity associated with light of signal 125 at the multiple different wavelengths can be based on the cumulative intensities of the light at the various particular wavelengths from the combined signals 123-1, 123-2, ..., 123-M.

In the embodiment illustrated in FIG. 1, the filtering mechanism associated with each input optical path 114-1, 114-2, ..., 114-M includes a number of wavelength filters 130-1, 130-2, ..., 130-N. However, embodiments are not limited to the filtering mechanism illustrated in FIG. 1. For instance, as described in connection with the embodiment of FIG. 2, a filtering mechanism that include one or more filter-modulator pairs.

In the embodiment of FIG. 1, the wavelength filters 130-1, 130-2, ..., 130-N can be optical ring resonators. In such embodiments, the ring resonators can each be configured to transmit light at a particular wavelength.

In various embodiments, each wavelength filter 130-1, 130-2, ..., 130-N can correspond to a respective particular wavelength (e.g., $\lambda 1, \lambda 2, \ldots, \lambda N$). For instance, filters 130-1, 130-2, ..., 130-N can be configured to transmit light corresponding to particular wavelengths $\lambda 1, \lambda 2, \ldots, \lambda N$, respectively (e.g., light having a wavelength other than the particular wavelength can be blocked by the filters). Embodiments are not limited to a particular number of wavelengths (e.g., "N" can be 2, 4, 8, 10, 15, or 32, among other numbers).

In the embodiment illustrated in FIG. 1, the number "N" is six. That is, the filtering mechanism associated with each input optical path 114-1, 114-2, ..., 114-M includes six wavelength filters (e.g., a wavelength filter corresponding to each of the six particular wavelengths A, B, C, D, E, and F).

As such, the modified optical signals 123-1, 123-2, and 123-M illustrated in FIG. 1 include selected wavelengths from the six particular wavelengths (e.g., selected ones of the six wavelengths A, B, C, D, E, and F). For instance, as shown in the embodiment of FIG. 1, signal 123-1 includes light at wavelengths B, C, D, and E but does not include light at wavelengths A or F.

In such an embodiment, signal 123-2 includes light at wavelengths A, B, D, and F, but does not include light at wavelengths C or E. Signal 123-M includes light at wavelengths A, C, D, and E, but does not include light at wavelengths B or F.

In various embodiments, the wavelength filters 130-1, 130-2, ..., 130-N can be operated as on/off switches (e.g., if the filter is turned "on" the particular wavelength associated with the filter is transmitted therethrough and if the filter is turned "off" the particular wavelength associated with the filter is not transmitted). For instance, in the above example, with respect to modified optical signal 123-1, the filters associated with the particular wavelengths A and F were "off" such that those wavelengths are absent from signal 123-1. That is, wavelengths A and F, which were present in signal 122-1 were not transferred through the filter mechanism (e.g., from input optical branch 114-1 to output optical branch 116-1).

In various embodiments, control signals can be provided to the filtering mechanism in order to affect a desired digital to analog conversion. The control signals can be provided from a digital control component, e.g., 150, and can be based on digital information, e.g., a digital data sequence stored in a memory and/or provided by a processor, for example. In such embodiments, the digital information can be coded as binary, grayscale, or even code, among other types of digital coding.

In various embodiments, a digital data sequence can include a multi-channel digital data array. In some such embodiments, each channel of the multi-channel digital array can provide a number of bits of data to be converted to the multi-wavelength analog optical signal. In various embodiments, the number of channels corresponds with the number of wavelengths represented in the multi-wavelength analog optical signal.

In the embodiment illustrated in FIG. 1, the digital control component 150 provides a number of control signals to the wavelength filters 130-1, 130-2, ..., 130-N associated with the respective optical input branches 114-1, 114-2, ..., 114-M. The control signals can be based on a digital data sequence and can be provided via connections 154-1, 154-2, ..., 154-M.

As used herein, the connections providing control signals can be referred to as the control signals themselves. For instance, the connections 154-1, 154-2, ..., 154-M can be referred to as control signals 154-1, 154-2, ..., 154-M.

In the embodiment of FIG. 1, the digital data stream to be converted to an analog signal, and associated with control component 150, includes a number of data portions 152-1, 152-2, ..., 152-N. The data portions can each include a digital data value (e.g., a number of bits) to be represented optically by the intensity of a particular wavelength of the number of wavelengths represented in the analog optical output signal 125.

That is, in such embodiments, each data portion can correspond to a particular wavelength. For instance, in the embodiment illustrated in FIG. 1, data portion 152-1 corresponds to wavelength $\lambda 1$, data portion 152-2 corresponds to $\lambda 2$, and data portion 152-N corresponds to $\lambda N$.

In the embodiment of FIG. 1, the control signals 154-1, 154-2, ..., 154-M provided from control component 150 are associated with the data portion 152-1, the control signals 156-1, 156-2, ..., 156-M are associated with the data portion 152-2, and the control signals 158-1, 158-2, ..., 158-M are associated with the data portion 152-N. The digital control component 150 can include a memory and/or a processor, among other electronic components capable of providing a digital data sequence, such as a data bus and/or application specific integrated circuit (ASIC), among other logic circuitry. In various embodiments, the control signals associated with each data portion are provided to a filtering component corresponding to control of the particular wavelength associated with the data portion.

For example, in the embodiment of FIG. 1, the control signals 154-1, 154-2, ..., 154-M can be used to control a respective wavelength filter 130-1 associated with wavelength $\lambda 1$, the control signals 156-1, 156-2, ..., 156-M can be used to control a respective wavelength filter 130-2 associated with wavelength $\lambda 2$, and the control signals 158-1, 158-2, ..., 158-M can be used to control a respective wavelength filter 130-N associated with wavelength $\lambda N$. As such, the control signals provided to the filters 130-1, 130-2, ..., 130-N associated with each of the optical input branches 114-1, 114-2, ..., 114-M can be used to operate the filters (e.g., to turn them on/off) based on the digital data sequence to be converted.

The filters 130-1, 130-2, ..., 130-N can be operated (e.g., via control signals corresponding to a digital data sequence as described above) to modify the particular wavelengths present in a number of split multi-wavelength signals. The embodiment of FIG. 1 illustrates three modified split multi-wavelength optical signals (e.g., signals 123-1, 123-2, and 123-M).

In various embodiments, the modified signals can be combined to produce a multi-wavelength analog optical signal. In the embodiment of FIG. 1, the split multi-wavelength signals 123-1, 123-2, and 123-M are combined using an optical power combiner 140, which can present the multi-wavelength analog optical signal 125 at the output 118.

In various embodiments, the intensity and/or power associated with each particular wavelength present in the multi-wavelength analog optical signal supplied from the optical power combiner can optically represent a digital data value. For instance, the intensity of the light at wavelength "A" in optical signal 125 shown in the embodiment of FIG. 1 can represent a particular digital value (e.g., a particular bit sequence) associated with data portion 152-1. Similarly, the intensity of the light at wavelength "B" in optical signal 125 can represent a particular digital value associated with data portion 152-2, and the intensity of the light at wavelength "F" in optical signal 125 can represent a particular digital value associated with data portion 152-N.

In this manner, embodiments of the present disclosure can convert digital information into a multi-wavelength analog optical signal (e.g., 125) directly and efficiently. As an example, various embodiments can provide benefits such as producing the multi-wavelength analog optical signal with a fewer optical components than previous optical D/A conversion systems. Also, embodiments of the present disclosure are not limited to use of incoherent optical light sources and can be used to convert multi-channel digital data arrays.

Figure 2:
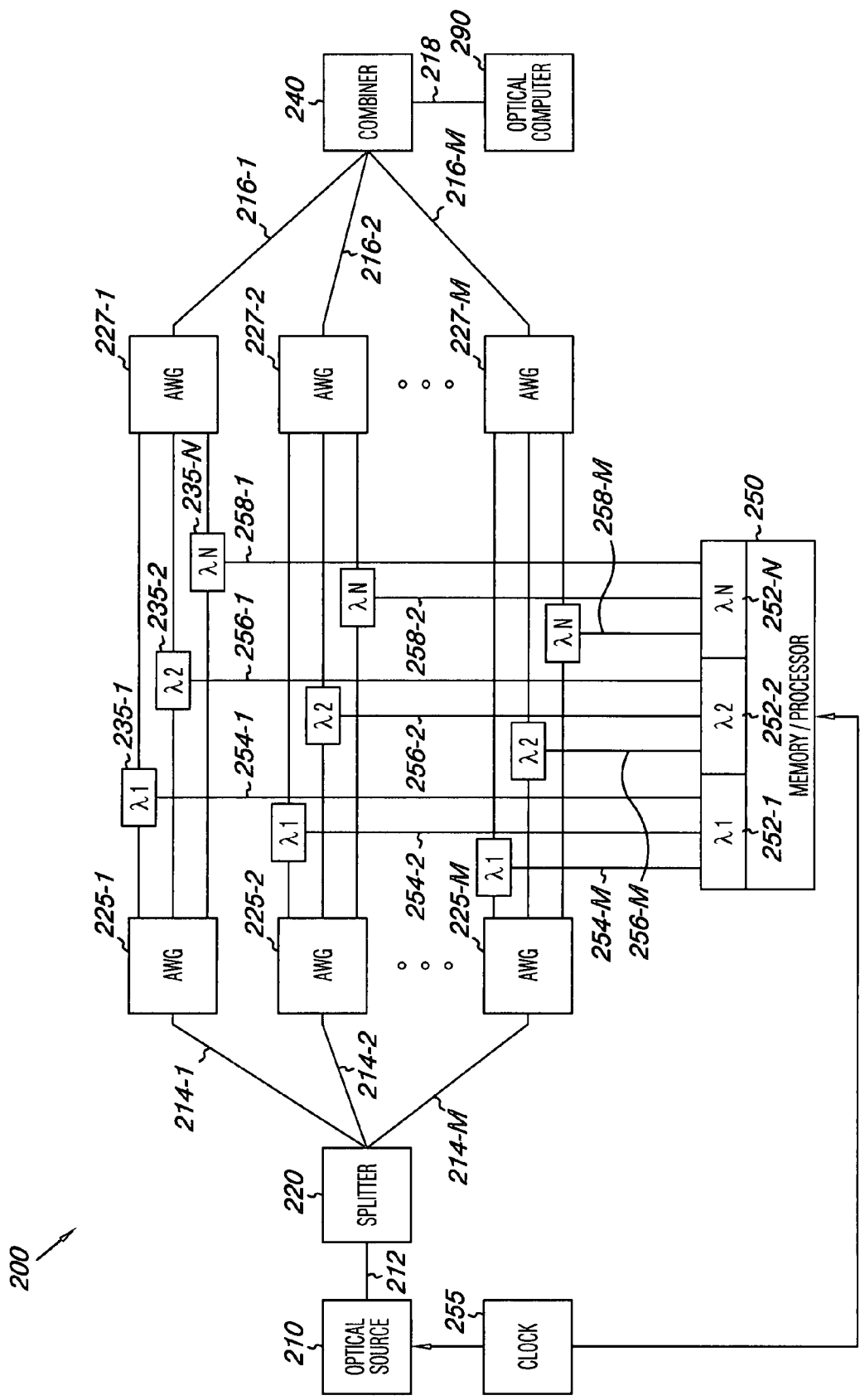
FIG. 2 illustrates another system for optical digital to analog conversion according to an embodiment of the present disclosure.

In various embodiments and as illustrated in FIG. 2, the converted multi-wavelength analog optical signal (e.g., 125) can be provided to an optical computing component. Embodiments are not so limited. For instance, the multi-wavelength analog optical signal (e.g., 125) can be provided to various sensors and/or sensing systems and/or can be used for various other applications.

FIG. 2 illustrates another system 200 for optical digital to analog conversion according to an embodiment of the present disclosure. The system 200 shown in FIG. 2 includes an optical source 210 that generates an optical signal (e.g., optical signal 115 shown in FIG. 1). The optical source can be a light source such as a continuous wave or pulsed laser source that can generate an optical signal at a desired wavelength, or wavelengths. In the embodiment of FIG. 2, the optical source 210 is a pulsed optical source such as a mode locked laser, for example. The pulsed optical source 210 can be controlled via clock 255 such that the pulsed optical signal output from the source has the same repetition rate as a data sequence associated with a digital control unit (e.g., memory/processor 250).

Although not shown in FIG. 2, the optical signal output from source 210 and provided to an optical splitter 220 via optical path 212 can be a multi-wavelength signal (e.g., multi wavelength signal 115 shown in FIG. 1). As described with respect to the embodiment of FIG. 1, the optical splitter can be an optical power splitter 220 that can optically split the optical signal into a number of split multi-wavelength optical signals, or optical beams (e.g., 122-1, 122-2, . . . , 122-M shown in FIG. 1).

In the embodiment of FIG. 2, the split optical signals each can have a corresponding optical path 214-1, 214-2, . . . , 214-M. In such embodiments, the total power associated with the optical signal generated by source 210 can be allocated among the number of split multi-wavelength signals, which can each include the same wavelengths present in the optical signal generated by source 210. The power associated with optical signal generated by source 210 can be allocated among the split multi-wavelength signals in various manners as described in connection with FIG. 1.

As described above, in various embodiments, the particular wavelengths present in the split multi-wavelength signals can be modified based on a digital input, and the modified signals can be recombined to produce an optically converted multi-wavelength analog optical signal (e.g., optically converted multi-wavelength analog optical signal 125 shown in FIG. 1).

In various embodiments, and as shown in FIG. 2, the optical paths 214-1, 214-2, . . . , 214-M corresponding to respective split multi-wavelength signals, can each be coupled to a wavelength filtering mechanism. The wavelength filtering mechanisms associated with the optical paths 214-1, 214-2, . . . , 214-M can be controlled in order to transfer selected wavelengths present in the respective split signals to respective output optical paths 216-1, 216-2, . . . , 216-M.

For instance, a wavelength filtering mechanism coupled between a first input optical path 214-1 and a first output optical path 216-1 can be controlled in order to transfer selected wavelengths present in a first split optical signal through the filtering mechanism to the output optical path 216-1. Similarly, a wavelength filtering mechanism coupled between a second input optical path 214-2 and a second output optical path 216-2 can be controlled in order to transfer selected wavelengths present in a second split optical signal through the filtering mechanism to the output optical path 216-2. Also, a wavelength filtering mechanism coupled between an "Mth" input optical path 214-M and an "Mth" output optical path 216-M can be controlled in order to transfer selected wavelengths present in an "Mth" split optical signal through the filtering mechanism to the output optical path 216-M.

As described in connection with FIG. 1, the modified optical signals can include light having only those selected wavelengths transferred through the filtering mechanism associated with the respective split optical paths. As shown in FIG. 2, the modified optical signals can be provided to an optical combiner 240 via the output optical paths 216-1, 216-2, . . . , 216-M. The combiner 240 can combine the modified optical signals to produce a multi-wavelength analog optical signal (e.g., 125).

In various embodiments, the filtering mechanism associated with each input optical path 214-1, 214-2, . . . , 214-M can include a number of wavelength filter-modulator pairings. In the embodiment illustrated in FIG. 2, each input optical path 214-1, 214-2, . . . , 214-M has a corresponding arrayed waveguide grating (AWG) pair having a number of optical modulators coupled therebetween. The optical modulators can be electro-optic modulators or electro-absorptive modulators, among other types of modulators.

In FIG. 2, input optical path 214-1 is coupled to AWG 225-1 and output optical path 216-1 is coupled to AWG 227-1, input optical path 214-2 is coupled to AWG 225-2 and output optical path 216-2 is coupled to AWG 227-2, and input optical path 214-M is coupled to AWG 225-M and output optical path 216-M is coupled to AWG 227-M. As illustrated in FIG. 2, a number of modulators 235-1, 235-2, . . . , 235-N are coupled between the AWG pairs (e.g., 225-1/227-1, 225-2/227-2, . . . , 225-M/227-M).

In various embodiments, the AWGs 225-1, 225-2, . . . , 225-M are configured to demultiplex the multi-wavelength split optical signals associated with the optical input paths 214-1, 214-2, . . . , 214-M, respectively. As shown in FIG. 2, the demultiplexed signals can be provided to the appropriate modulator 235-1, 235-2, . . . , 235-N associated with the particular wavelength (e.g., $\lambda 1, \lambda 2, \ldots, \lambda N$). In such embodiments, the AWGs 227-1, 227-2, . . . , 227-M can be configured to multiplex the signals received from the modulators and transmit the multiplexed signal along the respective output optical path 216-1, 216-2, . . . , 216-M.

In the embodiment illustrated in FIG. 2, the modulators 235-1, 235-2, ..., 235-N associated with each split optical path receive light at a particular wavelength from the corresponding AWG 225-1, 225-2, ..., 225-M. Whether or not the light received by the modulators is transferred to the associated multiplexing AWG 227-1, 227-2, ..., 227-M can be based on control signals provided to the modulators.

In such embodiments, the modulators can operate as switches. For instance, the modulators can be turned on via a control signal in order to transmit the particular wavelength or can be turned off via the control signal in order to prevent transmission of the particular wavelength.

In various embodiments, the control signals provided to the modulators can be based on a digital data sequence to be represented optically with a converted multi-wavelength analog optical signal. In various embodiments, the control signals can be provided to the modulators (e.g., 235-1, 235-2, ..., 235-N) in order to affect the desired digital to analog conversion. In the embodiment illustrated in FIG. 2, the control signals are provided from a digital control component 250 that can be a memory and/or processor, for example.

In the embodiment illustrated in FIG. 2, the memory/processor 250 provides control signals to the modulators 235-1 associated with the number of input optical paths 214-1, 214-2, ..., 214-M via connections 254-1, 254-2, ..., 254-M. The memory/processor 250 provides control signals to the modulators 235-2 associated with the number of input optical paths via connections 256-1, 256-2, ..., 256-M. The memory/processor 250 also provides control signals to the modulators 235-N associated with the number of input optical paths via connections 258-1, 258-2, ..., 258-M.

The connections providing control signals can be referred to as the control signals themselves. For instance, the connections 254-1, 254-2, ..., 254-M can be referred to as control signals 254-1, 254-2, ..., 254-M.

As described in connection with FIG. 1, in the embodiment of FIG. 2, the digital data stream to be converted to an analog signal, and associated with memory/processor 250, includes a number of data portions 252-1, 252-2, ..., 252-N. The data portions can each include a digital data value (e.g., a number of bits) to be represented optically by the intensity of a particular wavelength of the number of wavelengths represented in the analog optical output signal (e.g., converted multi-wavelength analog optical signal 125 shown in FIG. 1) provided at output 218.

That is, in such embodiments, each data portion can correspond to a particular wavelength. For instance, in the embodiment illustrated in FIG. 2, data portion 252-1 corresponds to wavelength $\lambda 1$, data portion 252-2 corresponds to $\lambda 2$, and data portion 252-N corresponds to $\lambda N$.

In the embodiment of FIG. 2, the control signals 254-1, 254-2, ..., 254-M provided from memory/processor 250 are associated with the data portion 252-1, the control signals 256-1, 256-2, ..., 256-M are associated with the data portion 252-2, and the control signals 258-1, 258-2, ..., 258-M are associated with the data portion 252-N. In the embodiment of FIG. 2, the control signals 254-1, 254-2, ..., 254-M can be used to control a respective modulator 235-1 associated with wavelength $\lambda 1$, the control signals 256-1, 256-2, ..., 256-M can be used to control a respective modulator 235-2 associated with wavelength $\lambda 2$, and the control signals 258-1, 258-2, ..., 258-M can be used to control a respective modulator 235-N associated with wavelength $\lambda N$. As such, the control signals provided to the modulators 235-1, 235-2, ..., 235-N associated with each of the optical input branches 214-1, 214-2, ..., 214-M can be used to operate the modulators (e.g., to turn them on/off) based on the digital data sequence to be converted.

The modulators 235-1, 235-2, ..., 235-N can be operated (e.g., via control signals corresponding to a digital data sequence as described above) to modify the particular wavelengths present in a number of split multi-wavelength signals. In various embodiments, and as described above in connection with FIG. 1, the modified signals can be combined to produce a multi-wavelength analog optical signal.

In the embodiment of FIG. 2, the split multi-wavelength signals are combined using an optical power combiner 240, which can present the multi-wavelength analog optical signal at the output 218.

As illustrated in FIG. 2, the converted multi-wavelength analog optical signal (e.g., 125 shown in FIG. 1) can be provided to an optical computing device 290 (e.g., an optical computer or other optical computing device). Embodiments are not so limited. For instance, the optically converted multi-wavelength analog optical signal can be provided to various sensors and/or sensing systems and/or can be used for various other applications.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. A method for converting digital information into an analog optical signal, comprising:
   receiving an optical signal that includes a plurality of wavelengths;
   splitting the received optical signal into a plurality of optical beams each including the plurality of wavelengths;
   modifying at least one of the plurality wavelengths present in at least one of the plurality of optical beams based on a digital input; and
   recombining the plurality of optical beams to produce an optically converted multi-wavelength analog optical signal.

2. The method of claim 1, where the method includes modifying the at least one of the plurality wavelengths present in each of the plurality of optical beams.

3. The method of claim 1, where the method includes coupling a number of wavelength filters between a respective input optical branch and output optical branch associated with each of the plurality of optical beams.

4. The method of claim 3, where the method includes controlling at least some of the number of wavelength filters with a number of digital input signals to modify the at least one of the plurality wavelengths present in the at least one of the plurality of optical beams.

5. The method of claim 3, where modifying the particular wavelengths includes filtering which of the plurality of wavelengths of the plurality of optical beams are transferred from the respective input optical branch to the respective output optical branch.

6. The method of claim 1, where the method includes splitting the received optical signal with an optical power splitter such that the optical power associated with the plurality of optical beams is different for at least two of the optical beams.

7. The method of claim 1, where the method includes generating the optical signal with a multi-wavelength comb optical source.

8. The method of claim 1, where modifying the particular wavelengths present in the plurality of optical beams includes:
providing each optical beam to a respective wavelength filter that transmits selected wavelengths, each wavelength filter coupled to one or more modulators; and
controlling whether the selected wavelengths associated with each optical beam are transferred to an output optical branch corresponding to each optical beam by providing control signals associated with the digital input to the one or more modulators.

9. An apparatus for optical digital to analog conversion, comprising:
an optical splitter that receives a multi-wavelength optical signal and splits the received optical signal into a plurality of split multi-wavelength signals;
a corresponding plurality of wavelength filtering mechanisms that receive the plurality of split multi-wavelength signals and modify at least one of the plurality of split multi-wavelengths present in the plurality of split multi-wavelength signals;
a digital control component that provides control signals to the wavelength filtering mechanisms for controlling modification of the at least one of the plurality of split multi-wavelengths; and
an optical combiner that recombines the modified plurality of split multi-wavelength signals to produce a multi-wavelength analog optical signal.

10. The apparatus of claim 9, where the plurality of wavelength filtering mechanisms include a number of optical ring resonators.

11. The apparatus of claim 9, where each of the corresponding plurality of wavelength filtering mechanisms are configured to modify the same wavelengths for the plurality of split multi-wavelength signals.

12. The apparatus of claim 9, where the plurality of wavelength filtering mechanisms includes:
an arrayed waveguide grating (AWG) pair for each of the respective plurality of split multi-wavelength signals; and
a number of modulators coupled to each AWG pair.

13. The apparatus of claim 9, where the control signals correspond to a digital data sequence.

14. The apparatus of claim 13, where the digital control component includes a processor and where the digital data sequence is provided to the processor.

15. The apparatus of claim 9, where the apparatus includes an optical amplifier coupled to at least one of:
the optical splitter; and
the optical combiner.

16. The apparatus of claim 9, where the received multi-wavelength optical signal is an incoherent optical signal.

17. The apparatus of claim 9, where the optical splitter is an optical power splitter and where the power associated with each of the plurality of split multi-wavelength signals is less than the power associated with the received multi-wavelength optical signal.

18. An optical system, comprising:
an optical source that generates a multi-wavelength optical signal;
an optical splitter that splits the multi-wavelength optical signal into a plurality of split multi-wavelength signals associated with a corresponding plurality of optical branches, each optical branch having an associated wavelength filtering mechanism that:
receives a number of control signals associated with a digital data sequence from a digital control component; and
modifies the number of wavelengths present in at least one of the split multi-wavelength signals based on the received control signals; and
an optical combiner coupled to the plurality of optical branches, where the combiner recombines the plurality of split multi-wavelength signals to produce an optically converted multi-wavelength analog optical signal.

19. The system of claim 18, where the wavelength filtering mechanism associated with each optical branch includes a number of optical ring resonators that receive the number of control signals.

20. The system of claim 18, where the wavelength filtering mechanism associated with each optical branch is configured to modify the same wavelengths for each of the plurality of split multi-wavelength signals.

21. The system of claim 18, where the system includes an optical computing component that receives the multi-wavelength analog optical signal.

22. The system of claim 18, where the optical source is a pulsed optical source.

23. The system of claim 18, where the digital data sequence includes a multi-channel digital array.

* * * * *